US012103815B2

(12) United States Patent
Yamasaki

(10) Patent No.: US 12,103,815 B2
(45) Date of Patent: Oct. 1, 2024

(54) IMAGE READING APPARATUS AND IMAGE FORMING APPARATUS

(71) Applicant: CANON KABUSHIKI KAISHA, Tokyo (JP)

(72) Inventor: Shogo Yamasaki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/320,128

(22) Filed: May 18, 2023

(65) Prior Publication Data

US 2023/0294943 A1 Sep. 21, 2023

Related U.S. Application Data

(63) Continuation of application No. 17/538,167, filed on Nov. 30, 2021, now Pat. No. 11,691,834.

(30) Foreign Application Priority Data

Dec. 2, 2020 (JP) ................................ 2020-200044

(51) Int. Cl.
*B65H 9/04* (2006.01)
*B65H 1/04* (2006.01)
(Continued)

(52) U.S. Cl.
CPC ................ *B65H 9/04* (2013.01); *B65H 1/04* (2013.01); *G03G 15/6529* (2013.01);
(Continued)

(58) Field of Classification Search
CPC .......... H04N 1/0066; B65H 1/04; B65H 9/04; B65H 31/20; B65H 31/34; B65H 2404/742; B65H 2301/3613; B65H 2301/3621
(Continued)

(56) References Cited

U.S. PATENT DOCUMENTS 5,433,427 A * 7/1995 Ishikawa ................ B65H 1/266 271/251
6,916,020 B2 * 7/2005 Hasegawa ................ B65H 1/04 271/223
(Continued)

FOREIGN PATENT DOCUMENTS

JP 2015035691 A * 2/2015

OTHER PUBLICATIONS

Machine translation of JP2016210611A; https://translationportal.epo.org/emtp/translate/?ACTION=description-retrieval&COUNTRY=JP&ENGINE=google&FORMAT=docdb&KIND=A&LOCALE=en_EP&NUMBER=2016210611&OPS=ops.epo.org/3.2&SRCLANG=ja&TRGLANG=en (Year: 2016).*

*Primary Examiner* — Leslie A Nicholson, III
(74) *Attorney, Agent, or Firm* — Canon U.S.A., Inc. IP Division

(57) ABSTRACT

An image reading apparatus includes a stacking portion, a feeding unit, a reading unit, and a discharge portion provided below the stacking portion. The feeding unit feeds a sheet stacked on the stacking portion in a feeding direction. The reading unit reads an image on the fed sheet and the discharge portion discharges the read sheet. The stacking portion includes first and second support surfaces that support the sheet and first and second regulating units to regulate a position of the sheet in a widthwise direction using two opposing ends of the sheet. The second support surface is retractable from a predetermined section above the discharge portion. The first support surface includes a downstream support portion that supports the sheet on a downstream side of the predetermined section in the feeding direction. A part of the second regulating surface is positioned on the downstream support portion.

10 Claims, 12 Drawing Sheets

(51) Int. Cl.
*G03G 15/00* (2006.01)
*B65H 31/00* (2006.01)

(52) U.S. Cl.
CPC .......... *B65H 31/00* (2013.01); *B65H 2402/31* (2013.01); *B65H 2402/32* (2013.01); *B65H 2403/411* (2013.01); *B65H 2404/742* (2013.01)

(58) Field of Classification Search
USPC ................................ 271/226, 248, 250, 253
See application file for complete search history.

(56) References Cited

U.S. PATENT DOCUMENTS 7,984,903 B2 * 7/2011 Coret ...................... B65H 1/06 271/171
8,550,459 B2 * 10/2013 Sekiguchi ............... B65H 7/02 271/226
8,764,008 B2 * 7/2014 Otsuki .................... B65H 9/06 271/227
9,284,137 B2 * 3/2016 Sato ........................ B65H 1/04
2002/0017754 A1 * 2/2002 Kang .................... B65H 31/02 271/223
2015/0084274 A1 * 3/2015 Kotaka ................. B65H 1/266 271/253

* cited by examiner

IMAGE READING APPARATUS AND IMAGE FORMING APPARATUS

CROSS REFERENCE TO RELATED APPLICATIONS

The present application is a continuation of U.S. patent application Ser. No. 17/538,167, filed on Nov. 30, 2021, which claims priority from Japanese Patent Application No. 2020-200044, filed Dec. 2, 2020, all of which are hereby incorporated by reference herein in their entireties.

BACKGROUND

Field

The present disclosure relates to an image reading apparatus configured to read an image on a sheet, and an image forming apparatus including the image reading apparatus.

Description of the Related Art

Conventionally, an image forming apparatus such as a copying machine, a facsimile apparatus, and a digital multifunction imaging apparatus is known to include an image reading apparatus configured to optically read an image on a sheet. There is an image reading apparatus of this type configured to convey documents stacked on a document tray one by one, read an image on the conveyed documents with a reading unit, and discharge the documents from which the image has been read to a discharge portion provided below the document tray. In such an image reading apparatus, since the discharge portion is provided below the document tray, the document on the discharge portion is hidden by the document tray. For this reason, particularly when a small-sized document is discharged, the visibility of the document on the discharge portion is poor, and the operability when the user takes out the document from the discharge portion is deteriorated.

In view of the above-described issue, Japanese Patent Application Laid-Open No. 2016-210611 proposes an image reading apparatus with improved visibility of a document on a discharge portion. In the image reading apparatus described in Japanese Patent Application Laid-Open No. 2016-210611, a document tray has a first support surface and a second support surface that support a document, and the second support surface is provided to be movable in a widthwise direction with respect to the first support surface. When the second support surface is moved in the widthwise direction and retracted from a predetermined section above the discharge portion, the user can visually recognize the document on the discharge portion through the predetermined section from which the second support surface has been retracted.

The documents stacked on the document tray are set with both ends in the widthwise direction in contact with a pair of regulating units provided to be movable in the widthwise direction, so that the oblique passing of documents to be generated is suppressed. However, in Japanese Patent Application Laid-Open No. 2016-210611, the regulating unit provided on the second support surface is disposed only on the second support surface. For this reason, the ends of the document are not regulated in the area downstream of the second support surface of the document tray, and the oblique passing may occur at the time of feeding the document, leading to reading failure.

SUMMARY

The present disclosure is directed to suppressing oblique passing to be generated at the time of feeding a document in an image reading apparatus in which a second support surface is provided to be movable in a widthwise direction with respect to a first support surface of a document tray.

According to an aspect of the present disclosure, an image reading apparatus includes a stacking portion on which a sheet is to be stacked, a feeding unit configured to feed the sheet stacked on the stacking portion in a feeding direction, a reading unit configured to read an image on the sheet fed by the feeding unit, and a discharge portion provided below the stacking portion and configured to discharge the sheet having the image read by the reading unit, wherein the stacking portion includes: a first support surface configured to support the sheet, a second support surface configured to support the sheet together with the first support surface and to be provided to be movable in a widthwise direction perpendicular to the feeding direction with respect to the first support surface, wherein the second support surface is retractable from a predetermined section above the discharge portion by moving in the widthwise direction with respect to the first support surface, a first regulating unit provided on the first support surface to be movable in the widthwise direction, having a first regulating surface with which one end of the sheet in the widthwise direction comes into contact, and configured to regulate a position of the sheet stacked on the stacking portion in the widthwise direction, and a second regulating unit provided on the second support surface to be movable in the widthwise direction together with the second support surface, having a second regulating surface with which an other end of the sheet opposite to the one end in the widthwise direction comes into contact, and configured to regulate a position of the sheet in the widthwise direction, wherein the first support surface includes a downstream support portion configured to support the sheet on a downstream side of the predetermined section in the feeding direction, and wherein a part of the second regulating surface is positioned on the downstream support portion.

Further features of the present disclosure will become apparent from the following description of exemplary embodiments with reference to the attached drawings.

DESCRIPTION OF THE EMBODIMENTS

Figure 1:
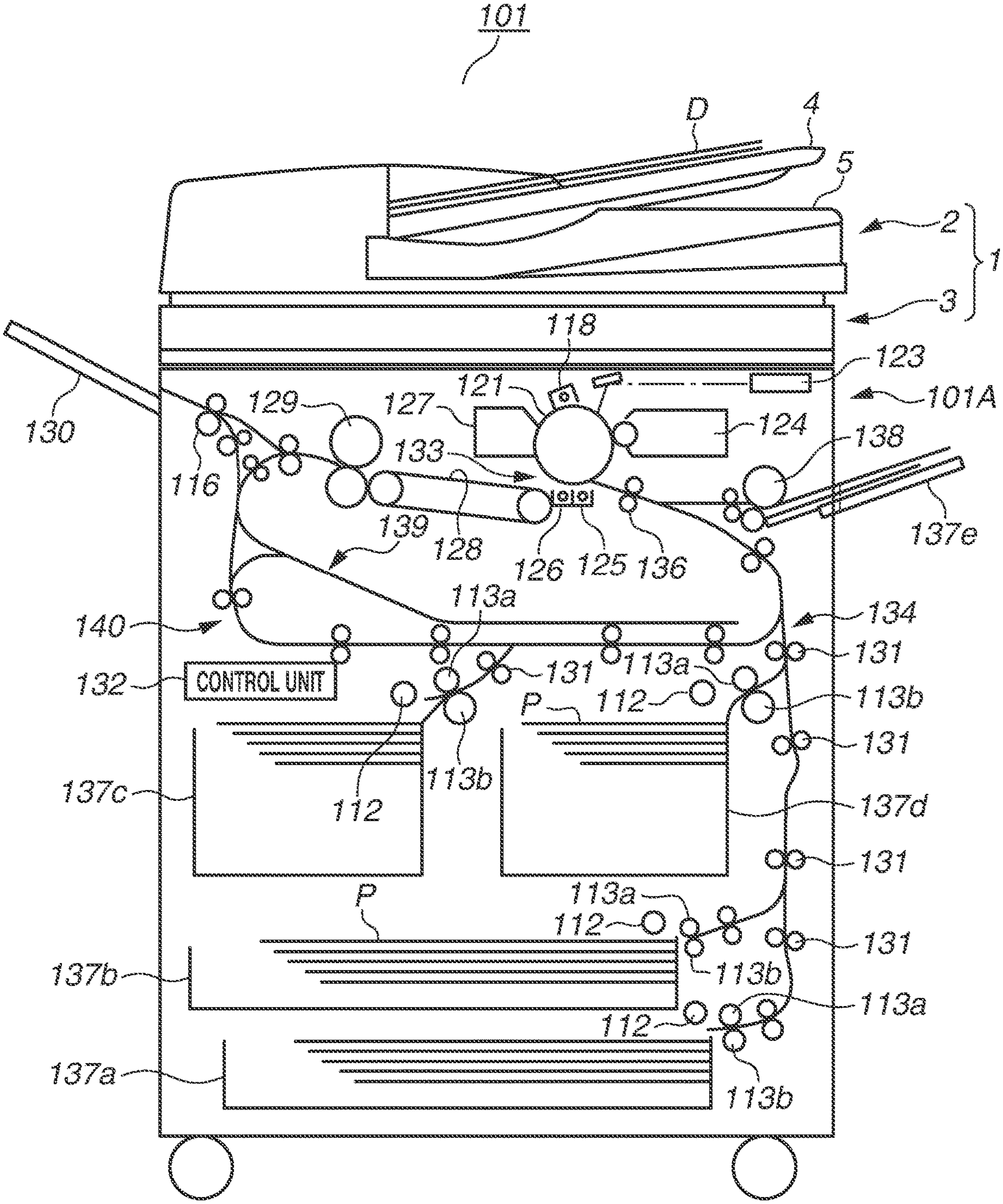
FIG. 1 is a cross-sectional view of an image forming apparatus according to a present exemplary embodiment.

An exemplary embodiment of the present disclosure will be described with reference to the drawings. The exemplary embodiment described below is an example of embodying the present disclosure, and does not limit the technical scope of the present disclosure. Identical reference numerals denote identical or corresponding parts throughout the drawings.

<Schematic Configuration of the Image Forming Apparatus>

A schematic configuration of an image forming apparatus 101 according to the present exemplary embodiment will be described with reference to FIG. 1. FIG. 1 is a schematic cross-sectional view of the image forming apparatus 101. Hereinafter, a position where the user faces an operation unit, which is not illustrated and via which the user performs various inputs/settings on the image forming apparatus 101, will be referred to as a "front side" of the image forming apparatus 101, and a rear face will be referred to as a "back side". In other words, FIG. 1 illustrates an internal configuration of the image forming apparatus 101 as viewed from the front side. Here, the image forming apparatus 101 is merely an example of an image forming apparatus to which the present disclosure is applied, and a facsimile apparatus, an inkjet printer, a multifunction apparatus, and the like including an image reading apparatus also correspond to the image forming apparatus 101 according to an exemplary embodiment of the present disclosure.

As illustrated in FIG. 1, the image forming apparatus 101 includes an image reading apparatus 1 above an image forming apparatus main body 101A. The image reading apparatus 1 includes an automatic document feeder (Auto Document Feeder, hereinafter referred to as an ADF) 2 and a reader 3, and optically scans a document D to read image information. The document D includes paper such as a piece of paper and an envelope, a plastic film such as a sheet for an overhead projector, and a sheet such as cloth. The image information converted into an electric signal by the image reading apparatus 1 is transferred to a control unit 132 provided in the image forming apparatus main body 101A.

The image forming apparatus main body 101A includes an image forming unit 133, which is an image forming portion that forms an image on a sheet P, which is a recording medium, and a sheet feeding unit 134 that feeds the sheet P to the image forming unit 133. The sheet feeding unit 134 includes sheet storage portions 137*a*, 137*b*, 137*c*, and 137*d* capable of storing sheets P having different sizes. The sheets P stored in the respective sheet storage portions are fed out by a pickup roller 112, separated one by one by a feed roller 113*a* and a retard roller 113*b*, and delivered to the corresponding pair of conveying rollers 131. The sheets P are sequentially delivered to a plurality of pairs of conveying rollers 131 arranged along the sheet conveying path to be conveyed to a pair of registration rollers 136.

The sheet P placed on a manual sheet feeding tray 137*e* by the user is fed to the inside of the image forming apparatus main body 101A by a feeding roller 138, and is conveyed to the pair of registration rollers 136. The pair of registration rollers 136 stops the leading end of the sheet P to correct oblique passing. Further, the pair of registration rollers 136 resumes the conveyance of the sheet P in accordance with the progress of the image forming operation, which is a toner image forming process by the image forming unit 133.

The image forming unit 133 that forms an image on the sheet P is an electrophotographic image forming unit including a photosensitive drum 121 that is a photosensitive member. The photosensitive drum 121 is rotatable along the conveying direction of the sheet P, and a charger 118, an exposure apparatus 123, a development device 124, a transfer charger 125, a separation charger 126, and a cleaner 127 are arranged around the photosensitive drum 121. The charger 118 uniformly charges the surface of the photosensitive drum 121. The exposure apparatus 123 exposes the photosensitive drum 121 on the basis of image information input from the image reading apparatus 1, and forms an electrostatic latent image on the photosensitive drum 121. The development device 124 stores a development material containing toner, and supplies charged toner to the photosensitive drum 121 to develop the electrostatic latent image into the toner image. The toner image carried on the photosensitive drum 121 is transferred to the sheet P conveyed from the pair of registration rollers 136 by a bias electric field formed by the transfer charger 125. The sheet P to which the toner image has been transferred is separated from the photosensitive drum 121 by the bias electric field formed by the separation charger 126, and is conveyed toward a fixing portion 129 by a pre-fixing conveyance portion 128. Adhering substances such as transfer residual toner remaining on the photosensitive drum 121 without being transferred to the sheet P are removed by the cleaner 127, and the photosensitive drum 121 prepares for the next image forming operation.

The sheet P conveyed to the fixing portion 129 is subjected to a fixing process including pressing and heating of the toner image while being nipped and conveyed by the pair of rollers. As a result, the toner is melted and then fixed, whereby the image is fixed on the sheet P. When the image output has been completed, the sheet P on which the fixed image has been obtained is discharged to a discharge tray 130 protruding outward from the image forming apparatus main body 101A via a pair of discharge rollers 116. In a case where an image is to be formed on the back surface of the sheet P in double-sided printing, the front surface and the back surface of the sheet P having passed through the fixing portion 129 are turned over by a reverse portion 139, and the sheet P is conveyed to the pair of registration rollers 136 by a double-sided conveyance portion 140. The sheet P on which an image is formed again by the image forming unit 133 is discharged to the discharge tray 130.

<Schematic Configuration of the Image Reading Apparatus>

Figure 2:
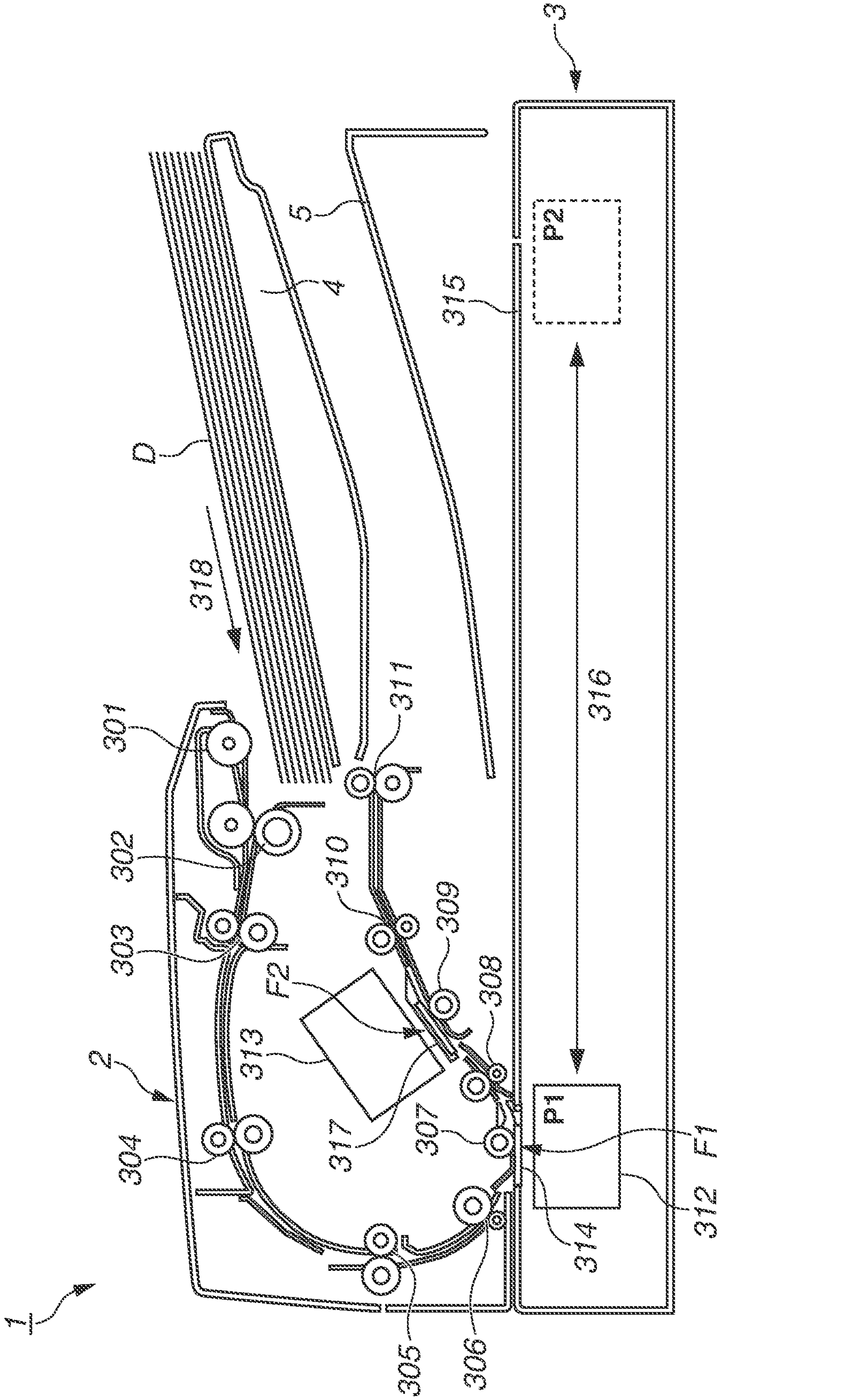
FIG. 2 is a cross-sectional view of an image reading apparatus according to the present exemplary embodiment.

A schematic configuration of the image reading apparatus 1 will be described with reference to FIG. 2. FIG. 2 is a schematic cross-sectional view of the image reading apparatus 1. As described above, the image reading apparatus 1 includes the reader 3 and the ADF 2. The ADF 2 conveys the document D stacked on a document tray 4, which is a stacking portion, and discharges the document D read by the reader 3 to a discharge tray 5, which is a discharge portion.

The reader 3 includes a first reading unit 312 that reads an image on the front surface of the document D. On the upper surface of the reader 3, a first flow reading glass plate 314 and a document platen glass 315, which are transparent members that transmit visible light, are provided. The document platen glass 315 is arranged next to the first flow reading glass plate 314 in a sub-scanning direction (the direction of an arrow 316 in FIG. 3). The first reading unit 312 is driven by a drive portion such as a drive belt, which is not illustrated, to be movable in the sub-scanning direction. The reader 3 moves the first reading unit 312 in the sub-scanning direction to read the image on the document D placed on the document platen glass 315. The first reading unit 312 reads the image on the front surface of the document D conveyed by the ADF 2 at a first reading position F1. Here, the sub-scanning direction in the present exemplary embodiment is a direction perpendicular to the main-scanning direction, which is a direction in which a plurality of light receiving elements included in the first reading unit 312 is arranged.

The ADF 2 includes a second reading unit 313 that reads an image on the back surface of the document D. The second reading unit 313 reads an image on the back surface of the document D conveyed by the ADF 2 at a second reading position F2 downstream of the first reading position F1 in the conveying direction of the document D. The ADF 2 is turnably supported with respect to the reader 3 by a hinge portion, which is not illustrated, disposed on the back side of the apparatus in FIG. 2 so that the document platen glass 315 can be opened. That is, in a state where the ADF 2 is turned upward and opened, the user can place or remove the document D on or from the document platen glass 315. Further, the ADF 2 is able to press the document D with a resin plate, which is not illustrated, so that the document D placed on the document platen glass 315 is not moved in a state where the ADF 2 is closed.

The ADF 2 includes the document tray 4 on which the documents D are stacked and the discharge tray 5 from which the documents D are discharged. The ADF 2 includes a feeding roller 301, which is a feeding unit that feeds the documents D stacked on the document tray 4, a pair of separation rollers 302 that separates the documents D one by one, and a first pair of conveying rollers 303 that extracts the separated document D. The feeding roller 301 feeds the document in a feeding direction (the direction indicated by the arrow 318). The document D separated from the other documents by the pair of separation rollers 302 is sequentially conveyed by the first pair of conveying rollers 303, a second pair of conveying rollers 304, a third pair of conveying rollers 305, a fourth pair of conveying rollers 306, a fifth pair of conveying rollers 308, and a sixth pair of conveying rollers 310. A pair of discharge rollers 311 that discharges the document D from which the image has been read to the discharge tray 5 is arranged downstream of the sixth pair of conveying rollers 310 in the conveying direction.

The ADF 2 includes a first platen roller 307 at a position facing the first flow reading glass plate 314 between the fourth pair of conveying rollers 306 and the fifth pair of conveying rollers 308. The first platen roller 307 is a roller member that can suppress floating of the document D from the first flow reading glass plate 314 by coming into contact with the back surface of the document D and rotating. The ADF 2 includes a second platen roller 309 at a position facing a second flow reading glass plate 317 between the fifth pair of conveying rollers 308 and the sixth pair of conveying rollers 310. The second platen roller 309 is a roller member that can suppress floating of the document D from the second flow reading glass plate 317 by coming into contact with the front surface of the document D and rotating.

An image reading operation by the image reading apparatus 1 will be described. The image reading apparatus 1 can execute the image reading operation in either the flowing document reading mode or the fixed-document reading mode on the basis of an explicit operation or the like by the user. The flowing document reading mode is a mode in which an image on a document is read while the ADF 2 is conveying the document D to pass document D through the reading positions F1 and F2 of the first reading unit 312 and the second reading unit 313, respectively. The fixed-document reading mode is a mode in which an image on a document placed on the document platen glass 315 by the user is read while the first reading unit 312 is moving in the sub-scanning direction.

In the case of the flowing document reading mode, the first reading unit 312 reads the image on the document while being fixed at a position P1 in accordance with the first reading position F1. The documents D placed on the document tray 4 are fed by the feeding roller 301 and separated one by one by a separation nip portion of the pair of separation rollers 302. The separated document D is pulled out by the first pair of conveying rollers 303, and then reaches the first reading position F1 via the second pair of conveying rollers 304, the third pair of conveying rollers 305, and the fourth pair of conveying rollers 306. At the first reading position F1, the front surface of the document D is optically scanned by the first reading unit 312 so that the image is read.

The document D having passed through the first reading position F1 reaches the second reading position F2 via the fifth pair of conveying rollers 308. At the second reading position F2, the back surface of the document D is optically scanned by the second reading unit 313 so that the image is read. The document D having passed through the second reading position F2 is discharged to the discharge tray 5 by the pair of discharge rollers 311 via the sixth pair of conveying rollers 310. Such a reading operation is repeatedly executed until a sensor, which is not illustrated, provided in the document tray 4 confirms that all the documents have been fed. In the present exemplary embodiment, the ADF 2 includes the second reading unit 313, and the back surface of the document D can be read by the second reading unit. However, the ADF 2 may not include the second reading unit 313. In a case where the ADF 2 does not include the second reading unit, the ADF 2 reads the image on the back surface of the document D by reversing the document D whose image on the front surface has been read at the first reading position F1 and conveying the document D back to the first reading position F1.

On the other hand, in the case of the fixed-document reading mode, the first reading unit 312 scans the document placed on the document platen glass 315 while reciprocating between the position P1 and a position P2 in the sub-scanning direction so that the document image is read. The control unit 132 of the image forming apparatus main body 101A grasps the position of the first reading unit 312 from a position sensor, which is not illustrated, and the number of rotation pulses of the motor. In the fixed-document reading mode and the flowing document reading mode, the image information acquired by the first reading unit 312 and the second reading unit 313 is sequentially transferred to the control unit 132 of the image forming apparatus main body 101A.

<Configuration of the Document tray>

Figure 3:
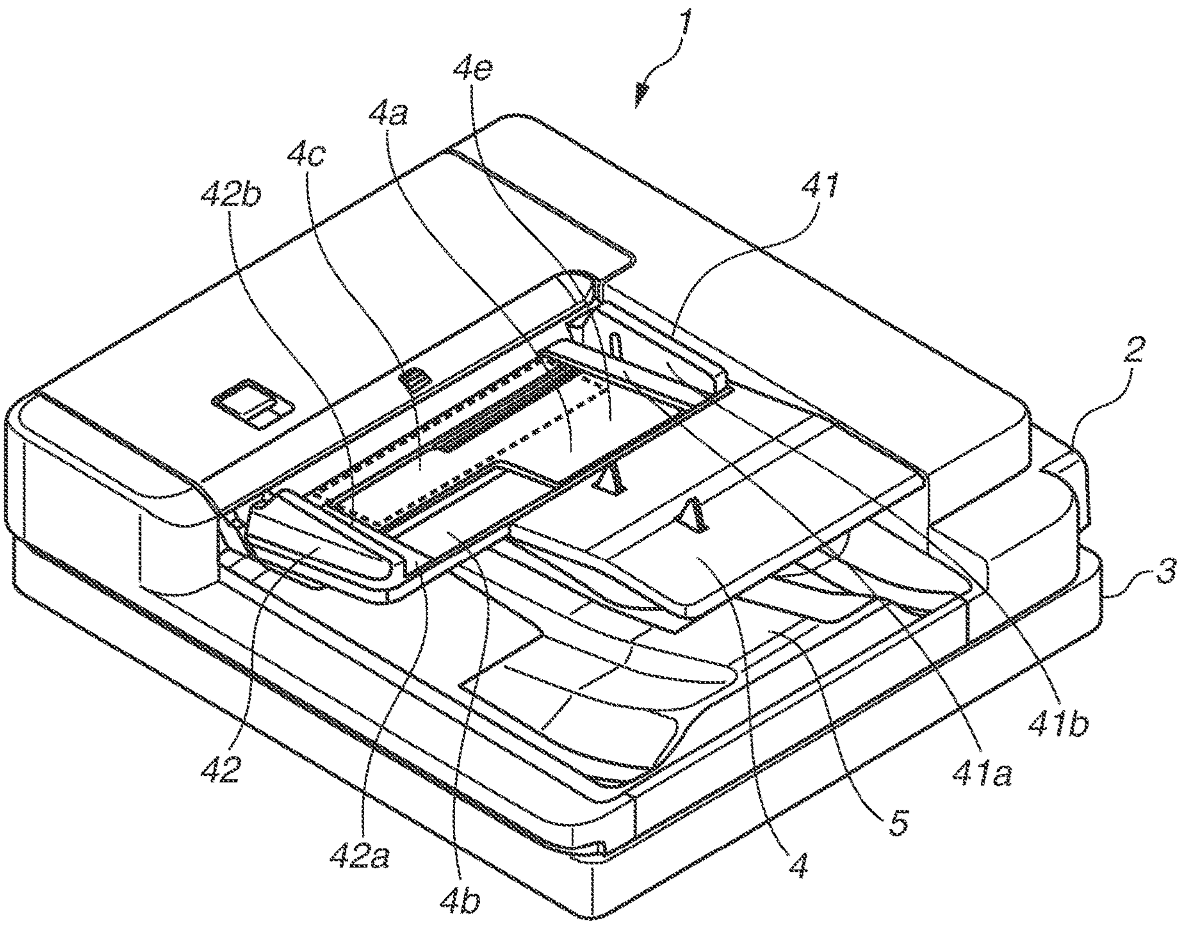
FIG. 3 is a perspective view of the image reading apparatus according to the present exemplary embodiment.

A configuration of the document tray 4 will be described with reference to FIGS. 3 to 6B. FIG. 3 is a perspective view of the image reading apparatus 1. As illustrated in FIG. 3, the document tray 4 includes a support surface 4*a*, which is a first support surface that supports the document from below, and a retraction support surface 4*b*, which is a second support surface. The retraction support surface 4*b* is provided to be movable in the widthwise direction with respect to the support surface 4*a*, and can be retracted from a predetermined section 4*d* (see FIG. 6A described below) above the discharge tray 5. FIG. 3 illustrates the document tray 4 in a state where the retraction support surface 4*b* is not retracted from the predetermined section 4*d*. That is, in FIG. 3, the predetermined section 4*d* is an area where the retraction support surface 4*b* is located. When the retraction support surface 4*b* is moved in the widthwise direction with respect to the support surface 4*a*, the retraction support surface 4*b* is moved so as to go under the support surface 4*a*. Here, the widthwise direction is a direction perpendicular to the feeding direction (direction indicated by the arrow 318 in FIG. 2) and along the support surface 4*a*. The support surface 4*a* includes a downstream support portion 4*c* that supports the document on the downstream side of the retraction support surface 4*b* in the feeding direction in FIG. 3. The downstream support portion 4*c* is an area of the support surface 4*a* surrounded by the dotted line in FIG. 3, and is a portion positioned downstream of the predetermined section 4*d* in the feeding direction. An upstream support portion 4*e* is a portion of the support surface 4*a* upstream of the downstream support portion 4*c*.

The document tray 4 includes a first regulating unit 41 and a second regulating unit 42 that regulate the position of the stacked documents D in the widthwise direction. The first regulating unit 41 and the second regulating unit 42 are provided to be movable in the widthwise direction with respect to the support surface 4*a*, and are moved in conjunction with each other in opposite directions in the widthwise direction by an interlocking mechanism described below. The second regulating unit 42 is fixed to the retraction support surface 4*b*, and the second regulating unit 42 is moved in the widthwise direction together with the retraction support surface 4*b*.

The first regulating unit 41 includes a support surface 41*a*, which is a third support surface that supports the document together with the support surface 4*a* and the retraction support surface 4*b*, and a regulating surface 41*b*, which is a first regulating surface with which one end on the back side of the document in the widthwise direction comes into contact. The support surface 41*a* is a surface along the support surface 4*a*, and the regulating surface 41*b* is a surface perpendicular to the support surface 41*a*. The second regulating unit 42 includes a support surface 42*a*, which is a fourth support surface that supports the document together with the support surface 4*a* and the retraction support surface 4*b*, and a regulating surface 42*b*, which is a second regulating surface with which one end on the front side of the document in the widthwise direction comes into contact. In other words, one end of the document in the widthwise direction comes into contact with the regulating surface 41*b* of the first regulating unit 41, and on the opposite side, the other end of the document in the widthwise direction comes into contact with the regulating surface 42*b* of the second regulating unit 42. The support surface 42*a* is a surface along the support surface 4*a*, and the regulating surface 42*b* is a surface perpendicular to the support surface 42*a*. The support surface 41*a* and the support surface 42*a* are arranged so as to be overlaid on the support surface 4*a*, and the support surface 41*a* and the support surface 42*a* have the same height. In other words, the support surface 41*a* and the support surface 42*a* are positioned on the same plane.

The end of the support surface 41*a* on the front side is inclined so as to be lower toward the center of the conveying path. Similarly, the end of the support surface 42*a* on the back side is inclined so as to be lower toward the center of the conveying path. Since the ends of the support surface 41*a* and the support surface 42*a* are inclined, the support surface 41*a* and the support surface 42*a* can scoop up both ends of the document when the first regulating unit 41 and the second regulating unit 42 are moved inward after the user places the document on the document tray 4. As a result, it is possible to suppress the document from being caught by the ends of the support surface 41*a* and the support surface 42*a* and suppress occurrence of creases in the document.

The second regulating unit 42 is provided such that the regulating surface 42*b* is positioned from the upstream end of the retraction support surface 4*b* to the downstream end of the downstream support portion 4*c* of the support surface 4*a*. For this reason, when the second regulating unit 42 is moved in the widthwise direction, a part of the regulating surface 42*b* is moved on the downstream support portion 4*c*. The regulating surface 41*b* of the first regulating unit 41 is positioned so as to be overlaid on the regulating surface 42*b* when viewed from the front side of the apparatus.

Figure 4:
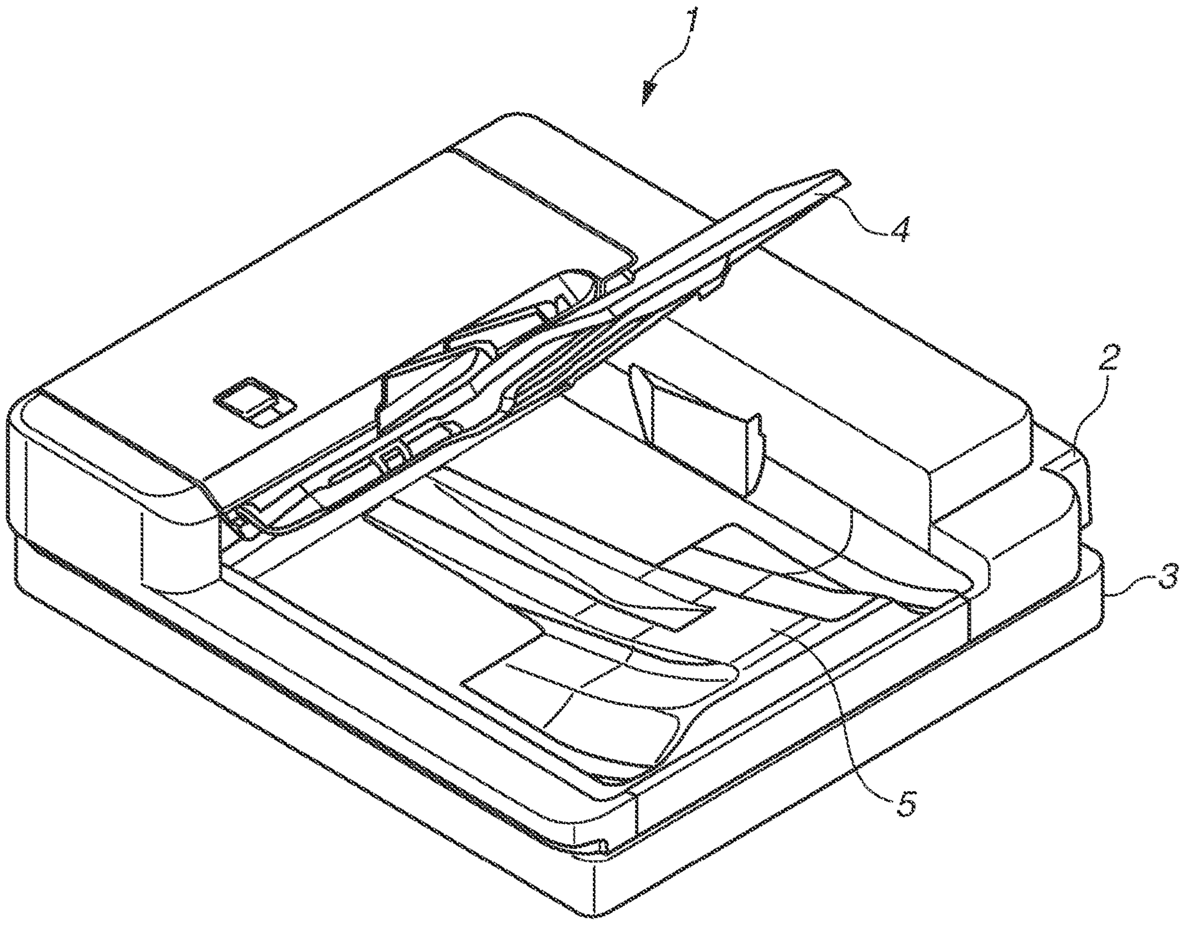
FIG. 4 is a perspective view of the image reading apparatus in a state where a document tray is turned upward.

FIG. 4 is a perspective view of the image reading apparatus 1 in a state where the document tray 4 is turned upward. The document tray 4 is provided to be turnable upward with rotating shafts 10*a* and 10*b* (see FIGS. 11A and 11B to be described below) extending in the widthwise direction as rotation centers. The rotating shafts 10*a* and 10*b* are provided on the back side and the front side of the apparatus of the document tray 4, respectively, and are inserted into round holes, which are not illustrated, of the ADF 2. After the reading of the document is completed, the user can easily take out the documents discharged to the discharge tray 5 by turning the document tray 4 upward as illustrated in FIG. 4.

When the user sets the document on the document tray 4, the user moves the first regulating unit 41 and the second regulating unit 42 based on the width of the document, and brings both ends of the document in the widthwise direction into contact with the regulating surface 41*b* and the regulating surface 42*b*. As a result, the position of the documents stacked on the document tray 4 in the widthwise direction is regulated, and oblique passing that occurs when the documents are fed is suppressed.

Figure 5A:
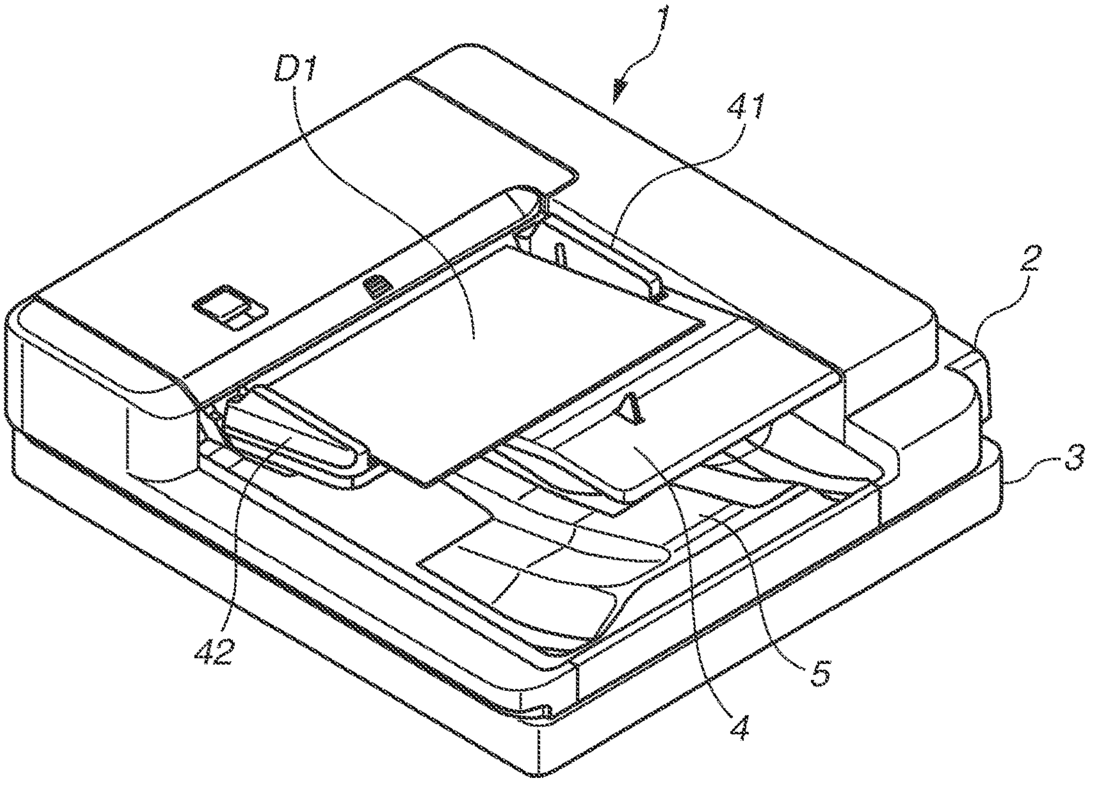
FIG. 5A is a perspective view of the image reading apparatus when a large-sized document is set.
Figure 5B:
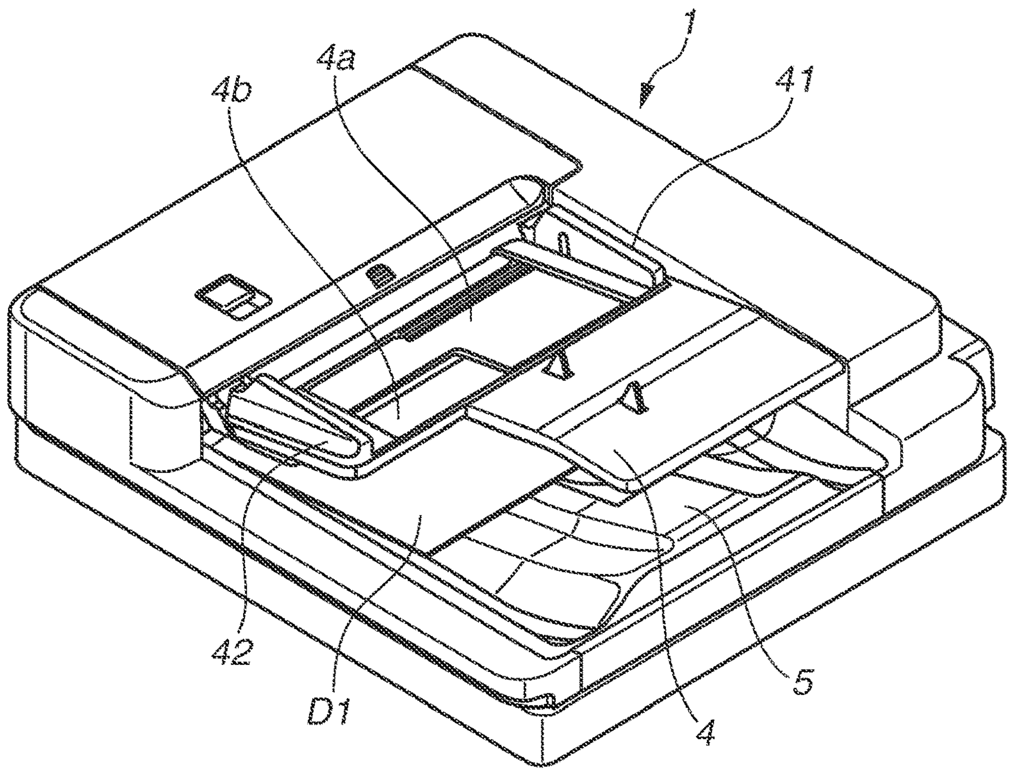
FIG. 5B is a perspective view of the image reading apparatus when a large-sized document is discharged.

FIG. 5A is a perspective view of the image reading apparatus 1 when a large-sized documenD1 is set on the document tray 4, and FIG. 5B is a perspective view of the image reading apparatus 1 when a large-sized document D1 is discharged to the discharge tray 5. In the present exemplary embodiment, the large-sized document D1 is a document of A4 size (210 [mm]×297 [mm]), and a small-sized document D2 to be described below is a document of business card size (55 [mm]×91 [mm]).

As illustrated in FIG. 5A, when the large-sized document D1 is placed on the document tray 4, the user moves the first regulating unit 41 and the second regulating unit 42 based on the width of the document D1. At this time, the back side of the document D1 is supported by the support surface 4*a* and the support surface 41*a*, and the front side is supported by the downstream support portion 4*c* of the support surface 4*a*, the retraction support surface 4*b*, and the support surface 42*a*. In this state, when the user gives an instruction to start reading to the image reading apparatus 1, the document D1 placed on the document tray 4 is fed by the feeding roller 301, and is discharged to the discharge tray 5 after the image is read. As illustrated in FIG. 5B, when the large-sized document D1 is discharged to the discharge tray 5, the user can visually recognize the document D1 through a notch (area where the support surface 4*a* is not located) on the upstream side of the retraction support surface 4*b* of the document tray 4 in the feeding direction.

Figure 6A:
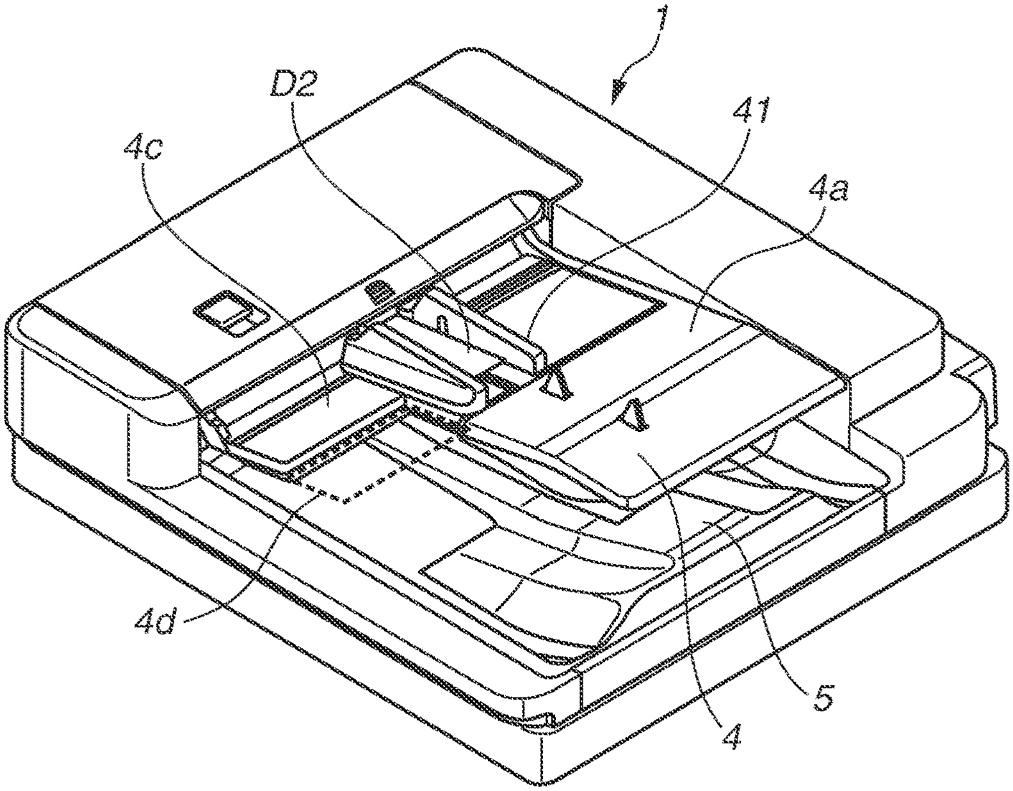
FIG. 6A is a perspective view of the image reading apparatus when a small-sized document is set.
Figure 6B:
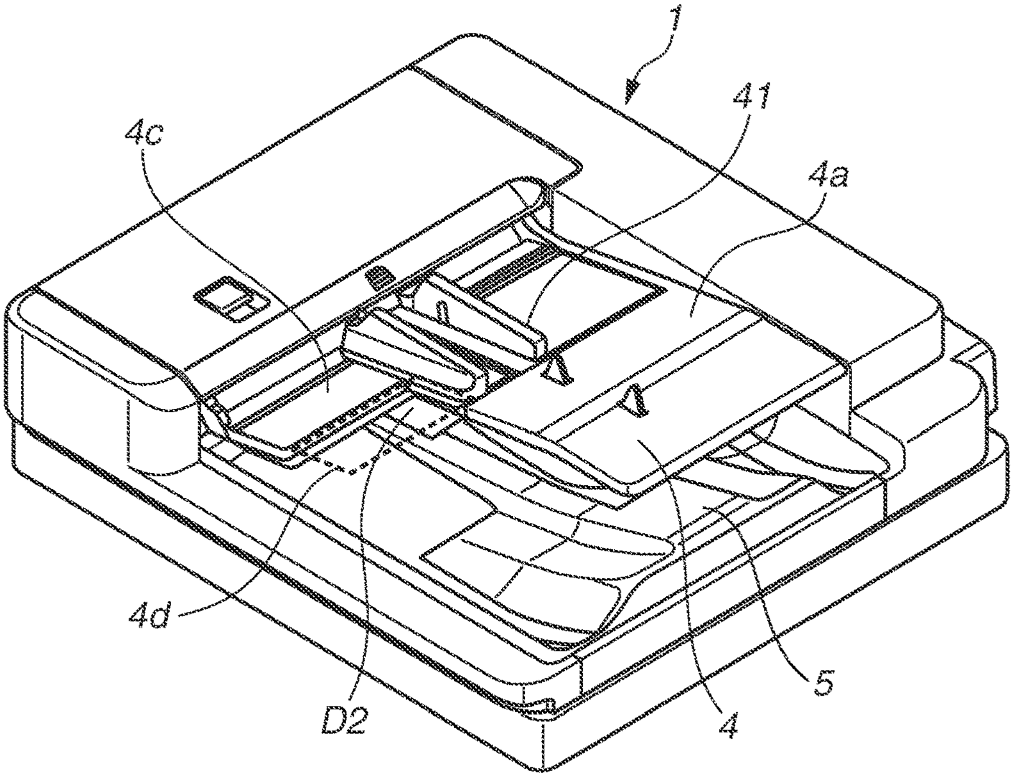
FIG. 6B is a perspective view of the image reading apparatus when a small-sized document is discharged.

FIG. 6A is a perspective view of the image reading apparatus 1 when a small-sized document D2 is set on the document tray 4, and FIG. 6B is a perspective view of the image reading apparatus 1 when a small-sized document D2 is discharged to the discharge tray 5. As illustrated in FIG. 6A, when the small-sized document D2 is set on the document tray 4, the user moves the first regulating unit 41 and the second regulating unit 42 in the widthwise direction based on the width of the document D. At this time, the small-sized document D2 is supported by the support surface 41*a* and the support surface 42*a*. As illustrated in FIG. 6A, when the small-sized document D2 is set on the document tray 4, the first regulating unit 41 and the second regulating unit 42 are moved inward in the widthwise direction as compared with the case where the large-sized document D1 is set on the document tray 4. Along with the movement of the second regulating unit 42, the retraction support surface 4*b* is also moved so as to go under the support surface 4*a*. As a result, the retraction support surface 4*b* is retracted from the predetermined section 4*d* above the discharge tray 5. Here, the predetermined section 4*d* is an area surrounded by the dotted line in FIG. 6A.

When the user gives an instruction to start reading to the image reading apparatus 1 in a state where the small-sized document D2 is set on the document tray 4, the document D2 set on the document tray 4 is fed by the feeding roller 301, and is discharged to the discharge tray 5 after the image is read. As illustrated in FIG. 6B, when the small-sized document D2 is discharged to the discharge tray 5, the user can visually recognize the document D1 through the predetermined section 4*d*. In this way, the user can confirm the small-sized document D2 on the discharge tray 5 even when viewing from obliquely above the image reading apparatus 1, and can easily take out the small-sized document D2.

<Configuration of the Regulating Units>

Figure 7:
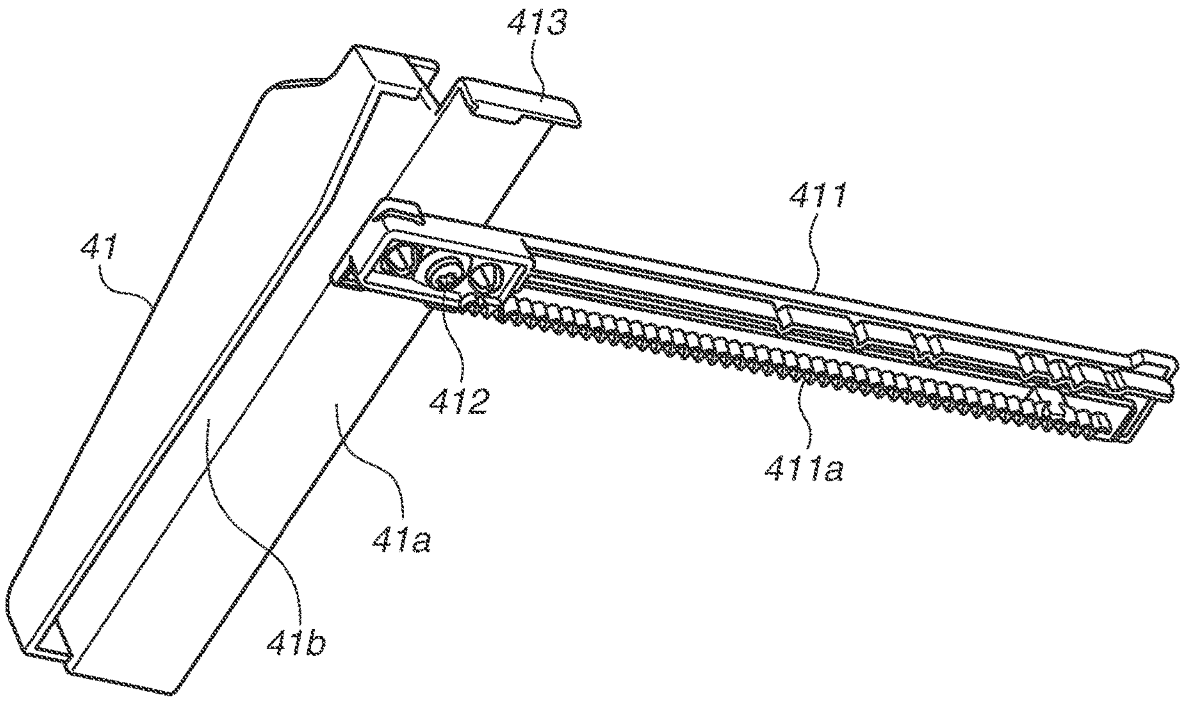
FIG. 7 is a perspective view of a first side regulation guide as viewed obliquely from below.
Figure 8:
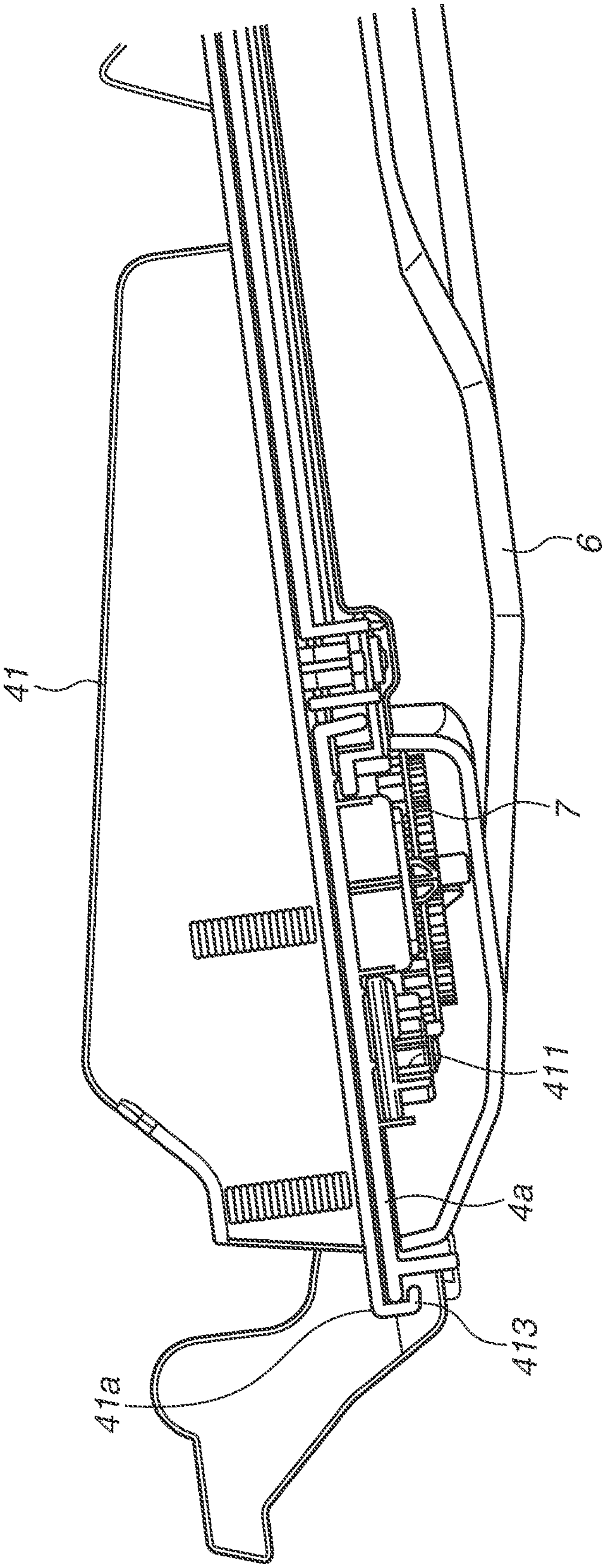
FIG. 8 is a partial cross-sectional view of a document tray.

Configurations of the first regulating unit 41 and the second regulating unit 42 will be described with reference to FIGS. 7 to 11B. FIG. 7 is a perspective view of the first regulating unit 41 as viewed obliquely from below. FIG. 8 is a partial cross-sectional view of the cross section of the document tray 4 as viewed from the front side of the apparatus. As illustrated in FIG. 7, a first interlocking member 411 is attached to the lower side of the support surface 41*a* of the first regulating unit 41 by a fixing member 412. The first interlocking member 411 is formed with a rack portion 411*a* in which a plurality of teeth is linearly arranged. As a method of fixing the first regulating unit 41 and the first interlocking member 411, the first regulating unit 41 and the first interlocking member 411 may be fixed by providing engagement shapes without using the fixing member 412. The first regulating unit 41 and the first interlocking member 411 may be integrally formed.

A hook portion 413 for preventing the first regulating unit from floating from the support surface 4*a* is formed at a downstream end of the support surface 41*a* of the first regulating unit 41 in the feeding direction. The hook portion 413 has a hook shape protruding downward from a downstream end of the support surface 41*a* in the feeding direction and having a leading end bent upstream. As illustrated in FIG. 8, the first regulating unit 41 and the first interlocking member 411 are attached so as to hold the support surface 4*a* therebetween. The hook portion 413 formed on the first regulating unit 41 protrudes downstream of the downstream end of the support surface 4*a* (downstream support portion 4*c*) in the feeding direction, and is positioned such that the hook-shaped leading end of the hook portion 413 enters under the support surface 4*a*. In this way, it is possible to suppress floating of the downstream end of the first regulating unit 41 in the feeding direction from the support surface 4*a*. The lower side of the document tray 4 is covered by a cover 6.

Figure 9:
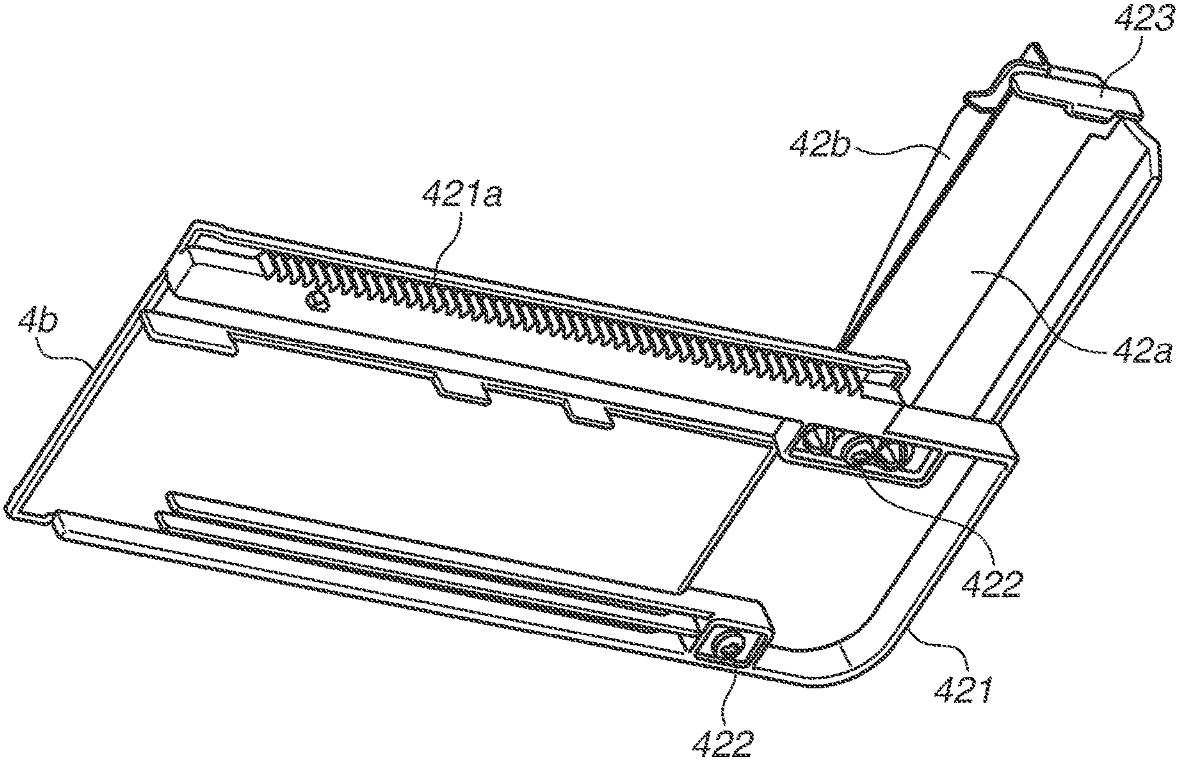
FIG. 9 is a perspective view of a second side regulation guide as viewed obliquely from below.
Figure 10:
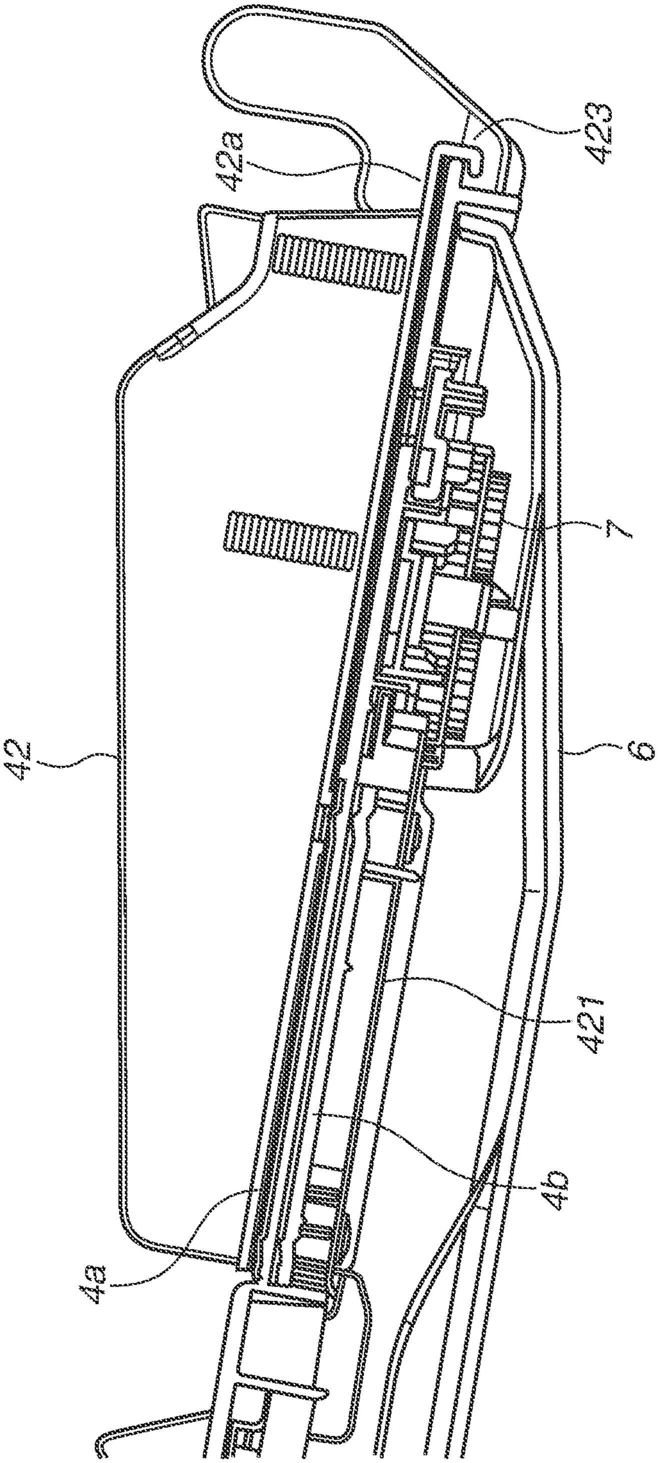
FIG. 10 is a partial cross-sectional view of the document tray.

FIG. 9 is a perspective view of the second regulating unit 42 as viewed obliquely from below. FIG. 10 is a partial cross-sectional view of the cross section of the document tray 4 as viewed from the back side of the apparatus. As illustrated in FIG. 9, a second interlocking member 421 having the retraction support surface 4*b* is attached to the lower side of the support surface 42*a* of the second regulating unit 42 by two fixing members 422. The upper surface of the second interlocking member 421 is the retraction support surface 4*b*. The back side of the retraction support surface 4*b* of the second interlocking member 421 is formed with a rack portion 421*a* in which a plurality of teeth is linearly arranged. As a method of fixing the second regulating unit 42 and the second interlocking member 421, the second regulating unit 42 and the second interlocking member 421 may be fixed by providing engagement shapes without using the fixing members 422. The second regulating unit 42 and the second interlocking member 421 may be integrally formed.

A hook portion 423 for preventing the second regulating unit 42 from floating from the support surface 4*a* is formed at a downstream end of the support surface 42*a* of the second regulating unit 42 in the feeding direction. The hook portion 423 has the same hook shape as the hook portion 413 that protrudes downward from a downstream end of the support surface 42*a* in the feeding direction and having a leading end bent upstream. As illustrated in FIG. 10, the second regulating unit 42 and the second interlocking member 421 are attached so as to hold the support surface 4*a* therebetween. The hook portion 423 formed on the second regulating unit 42 protrudes downstream of the downstream end of the support surface 4*a* in the feeding direction, and is positioned such that the hook-shaped leading end of the hook portion 423 enters under the support surface 4*a*. In this way, it is possible to suppress floating of the second regulating unit 42 from the support surface 4*a* at the downstream end in the feeding direction.

Figure 11A:
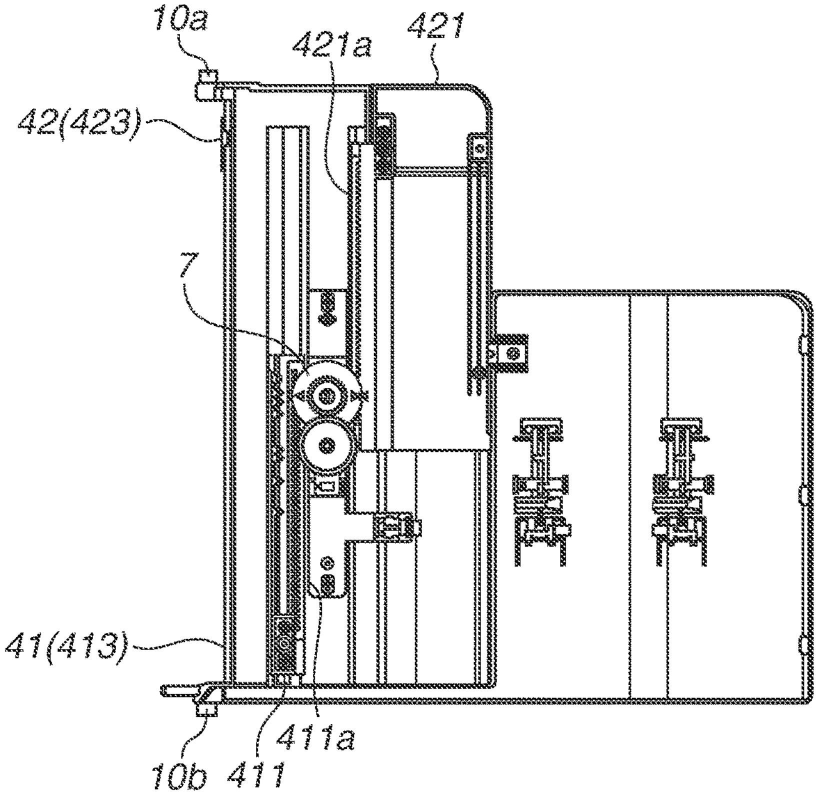
FIG. 11A is a bottom view of the document tray when a large-sized document is set.
Figure 11B:
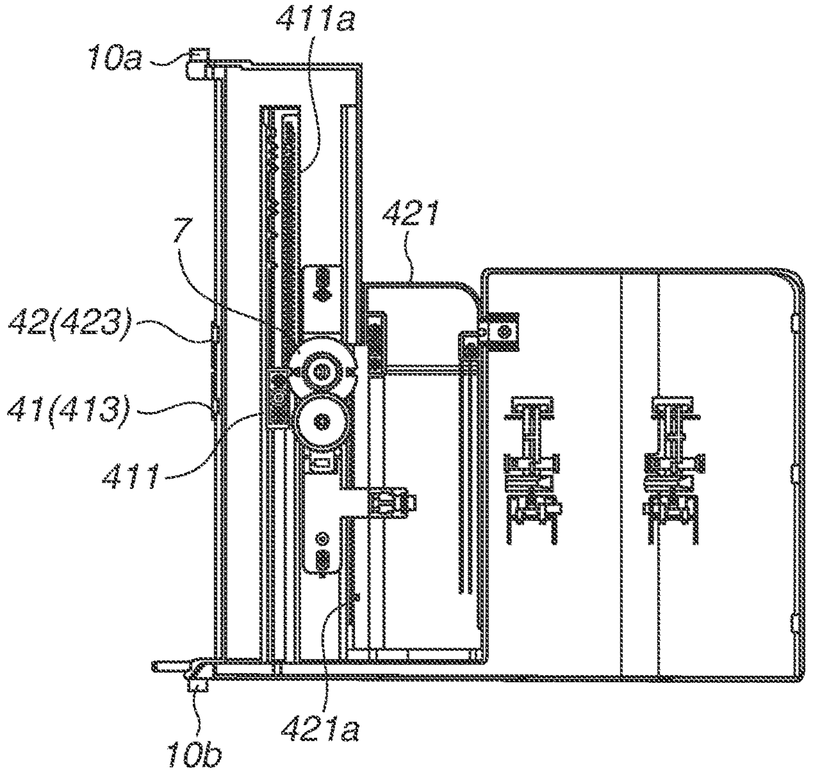
FIG. 11B is a bottom view of the document tray when a small-sized document is set.

FIG. 11A is a bottom view of the document tray 4 when the large-sized document D1 is set on the document tray 4, and FIG. 11B is a bottom view of the document tray 4 when the small-sized document D2 is set on the document tray 4. In FIGS. 11A and 11B, the cover 6 of the document tray 4 is omitted. When the document tray 4 in the state illustrated in FIG. 11A is viewed from above, the retraction support surface 4*b* is exposed to the upper portion as illustrated in FIG. 5B. When the document tray 4 in the state illustrated in FIG. 11B is viewed from above, the retraction support surface 4*b* is hidden under the support surface 4*a* as illustrated in FIG. 6B. That is, in FIG. 11B, the retraction support surface 4*b* is retracted from the predetermined section 4*d* above the discharge tray 5.

The document tray 4 is provided with a gear 7 so as to mesh with both the rack portion 411*a* and the rack portion 421*a*. When the first regulating unit 41 is moved so as to approach the second regulating unit 42, the first interlocking member 411 attached to the first regulating unit 41 is also moved in the same direction. At this time, the gear 7 meshing with the rack portion 411a of the first interlocking member 411 rotates. Since the rack portion 421a of the second interlocking member 421 meshes with the gear 7, the second interlocking member 421 and the second regulating unit 42 are moved in the direction opposite to the direction in which the first regulating unit 41 is moved, as a result of the rotation of the gear 7. Even when the second regulating unit 42 is moved so as to approach the first regulating unit 41, the first regulating unit 41 is moved in the direction opposite to the direction in which the second regulating unit 42 is moved. As described above, when one of the first regulating unit 41 and the second regulating unit 42 is moved in the widthwise direction, the other is moved in conjunction in the opposite direction. As a result, the user can move both the first regulating unit 41 and the second regulating unit 42 based on the document width only by holding and moving one of the first regulating unit 41 and the second regulating unit 42.

The gear 7 and the first interlocking member 411 are arranged below the downstream support portion 4c. In other words, the downstream support portion 4c covers the gear 7 and the first interlocking member 411 from above when viewed from above in the vertical direction. Accordingly, the gear 7 and the first interlocking member 411 block the view of the document tray 4 from above regardless of the positions of the first regulating unit 41 and the second regulating unit 42.

Figure 12:
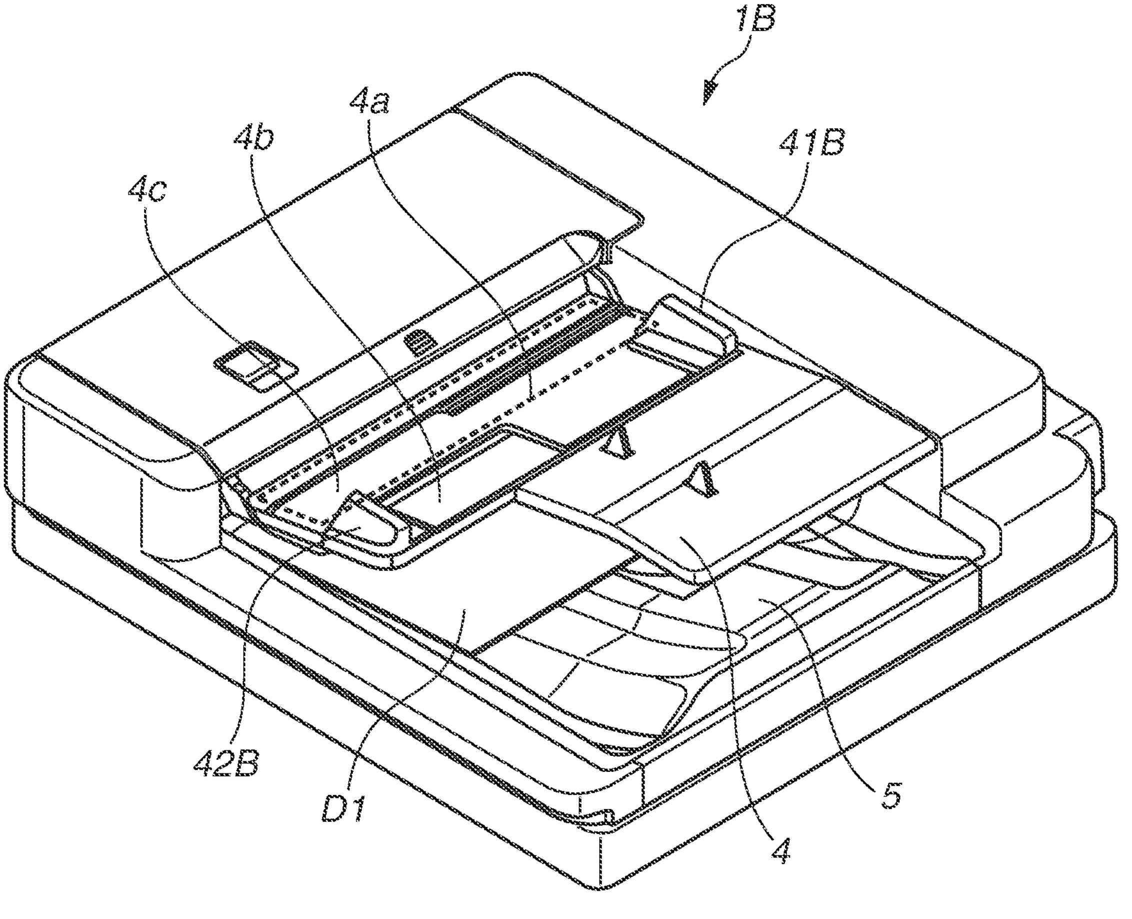
FIG. 12 is a perspective view of an image reading apparatus according to a comparative example.

An image reading apparatus 1B according to a comparative example will be described with reference to FIG. 12. FIG. 12 is a perspective view when a large-sized document D1 is discharged to a discharge tray 5 of the image reading apparatus 1B. The image reading apparatus 1B of FIG. 12 according to the comparative example is different from the above-described image reading apparatus 1 only in the configurations of a first regulating unit 41B and a second regulating unit 42B, and the configurations other than the first regulating unit 41B and the second regulating unit 42B are the same. The second regulating unit 42B of the image reading apparatus 1B is provided only on a retraction support surface 4b. That is, the second regulating unit 42B of the image reading apparatus 1B is not disposed on a downstream support portion 4c of a support surface 4a. In such a configuration, since the position of a document is not regulated on the downstream support portion 4c, oblique passing increases when the document is fed.

On the other hand, as described in the present exemplary embodiment, the second regulating unit 42 of the image reading apparatus 1 is provided such that the regulating surface 42b is positioned on the downstream support portion 4c of the support surface 4a. For this reason, unlike the image reading apparatus 1B, which is a comparative example, the second regulating unit 42 of the image reading apparatus 1 can regulate the position of the document also on the downstream side of the document tray 4 in the feeding direction. In this way, oblique passing occurring at the time of feeding the document is suppressed, and the occurrence of reading failure can be reduced.

In the present exemplary embodiment, the second regulating unit 42 is provided such that the regulating surface 42b is positioned from the upstream end of the retraction support surface 4b to the downstream end of the downstream support portion 4c in the feeding direction. The second regulating unit 42 may be provided such that at least a part of the regulating surface 42b is positioned on the downstream support portion 4c of the support surface 4a.

In the present exemplary embodiment, the first regulating unit 41 and the second regulating unit 42 are interlocked by one gear 7, but the first regulating unit 41 and the second regulating unit 42 may be interlocked by a plurality of gears.

In the present exemplary embodiment, the document tray 4 is provided so as to be turnable upward, but the document tray 4 may be fixed to the ADF 2.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An image reading apparatus comprising:
a stacking portion on which a sheet is to be stacked;
a feeding unit configured to feed the stacked sheet in a feeding direction; and
a reading unit configured to read an image on the sheet fed by the feeding unit,
wherein the stacking portion includes:
a first support surface configured to support the sheet,
a second support surface configured to move, in a widthwise direction perpendicular to the feeding direction, between a first position where the second support surface supports the sheet together with the first support surface and a second position where the second support surface retracts from the first position,
a first regulating unit provided on the first support surface to be movable in the widthwise direction, having a first rack portion in which a plurality of first teeth is linearly provided, and configured to regulate a position of the sheet stacked on the stacking portion in the widthwise direction,
a second regulating unit provided on the second support surface to be movable in the widthwise direction together with the second support surface, having a second rack portion in which a plurality of second teeth is linearly provided, and configured to regulate a position of the sheet in the widthwise direction, and
a gear unit arranged so as to mesh with both the first rack portion and the second rack portion and configured to interlock the first regulating unit and the second regulating unit,
wherein the first support surface includes a downstream support portion configured to support the sheet on a downstream of the second support surface with respect to the feeding direction and configured to cover both the entire first rack portion and the entire second rack portion as viewed from above regardless of positions of the first regulating unit and the second regulating unit.

2. The image reading apparatus according to claim 1,
wherein the first regulating unit has a first regulating surface with which one end of the sheet in the widthwise direction is to come into contact,
wherein the second regulating unit has a second regulating surface with which an other end of the sheet opposite to the one end in the widthwise direction is to come into contact, and
wherein the second regulating surface extends from an upstream end of the second support surface to a downstream end of the downstream support portion in the feeding direction.

3. The image reading apparatus according to claim 1,
wherein the first regulating unit has a first regulating surface with which one end of the sheet in the widthwise direction is to come into contact,
wherein the second regulating unit has a second regulating surface with which an other end of the sheet opposite to the one end in the widthwise direction is to come into contact, and
wherein a part of the second regulating surface is configured to be moved in the widthwise direction on the downstream support portion.

4. The image reading apparatus according to claim 1, wherein the stacking portion is provided to be turnable upward.

5. The image reading apparatus according to claim 1,
wherein the first regulating unit includes a third support surface configured to support the sheet together with the first support surface and the second support surface, and
wherein the second regulating unit includes a fourth support surface configured to support the sheet together with the first support surface and the second support surface.

6. The image reading apparatus according to claim 5,
wherein the third support surface is arranged so as to be overlaid on the first support surface, and
wherein the fourth support surface is arranged so as to be overlaid on the downstream support portion.

7. The image reading apparatus according to claim 5, wherein the third support surface and the fourth support surface are positioned on the same plane.

8. The image reading apparatus according to claim 1, wherein, when one of the first regulating unit or the second regulating unit is moved in one direction, the other of the first regulating unit or the second regulating unit is moved in conjunction in a direction opposite to the one direction.

9. The image reading apparatus according to claim 1, further comprising a discharge tray provided below the stacking portion and onto which the sheet is discharged.

10. The image reading apparatus according to claim 1, wherein the second support surface is positioned under the first support surface when the second support surface is positioned at the second position.

* * * * *